United States Patent
Fang et al.

(10) Patent No.: US 7,215,040 B2
(45) Date of Patent: May 8, 2007

(54) HALF-BRIDGE CONVERTER WITH ZERO-VOLTAGE SWITCHING AND SNUBBER

(76) Inventors: Hutang Fang, No. 4 Box, Unit 1, 30 Building, South Section of Nanchang University, Nanchang City, Jiangxi 330029 (CN); Hua Fang, No. 4 Box, Unit 1, 30 Building, South Section of Nanchang University, Nanchang City, Jiangxi 330029 (CN)

(*) Notice: Subject to any disclaimer, the term of this patent is extended or adjusted under 35 U.S.C. 154(b) by 0 days.

(21) Appl. No.: 10/497,436

(22) PCT Filed: Dec. 3, 2002

(86) PCT No.: PCT/CN02/00863

§ 371 (c)(1),
(2), (4) Date: Aug. 11, 2004

(87) PCT Pub. No.: WO03/052915

PCT Pub. Date: Jun. 26, 2003

(65) Prior Publication Data
US 2004/0245973 A1    Dec. 9, 2004

(30) Foreign Application Priority Data
Dec. 3, 2001    (CN) ............... 01 1 39785

(51) Int. Cl.
*H02J 1/10*    (2006.01)

(52) U.S. Cl. ............. 307/43; 307/87; 327/100
(58) Field of Classification Search ............. 323/224, 323/235, 282; 307/87, 43, 71; 327/100
See application file for complete search history.

(56) References Cited

U.S. PATENT DOCUMENTS 5,594,324 A    1/1997  Canter et al.
6,487,092 B2 *  11/2002 Nishikawa ............... 363/17

FOREIGN PATENT DOCUMENTS

CN    1099915    3/1995
CN    1209682    2/2003

* cited by examiner

*Primary Examiner*—Shawn Riley
(74) *Attorney, Agent, or Firm*—Ladas & Parry LLP

(57) ABSTRACT

A method and apparatus for digital power processing operating with zero-voltage switching, which enables zero-voltage switching under the condition that the frequencies are not constant, or the load currents are different. Two switching components are connected with the power supplies and are in parallel connection with a capacitance and in reverse parallel connection with a diode, respectively, which switching components, together with their auxiliary components, constitute up side and down side of a semi-circuitry which connects to a output of the converter via an inductance. The frequencies of the control signals of this converter can be variable, thus the converter can achieve the zero-voltage switching under the condition that the frequencies are not constant.

5 Claims, 2 Drawing Sheets

HALF-BRIDGE CONVERTER WITH ZERO-VOLTAGE SWITCHING AND SNUBBER

SCOPE OF TECHNOLOGY

This invention relates to method an apparatus for digital power processing operating with zero-voltage switching.

BACKGROUND ART

Conversion of digital power must be working in the turn-on and turn-off status. Each operation of turn-on and turn-off is completed in a limited period of time and the duration for the turn-on and turn-off status of the switching components (or circuits) is determined by their properties. Each turn-on or turn-off operation will cause consumption. The value of the switching consumption equals to the value obtained by integrating multiplication of the current flowing in the switching components (or circuits) by the voltage across the switching components (or the circuits) over the duration of one turn-on or turn-off operation. Thus, the higher the switching frequency of the switching component is, the more the switching consumption becomes. Especially when the frequency is very high, such switching consumption becomes majority of the consumption and can increase the aggregate switching consumption of the switching components. Sometimes, such switching consumption can even take more than 15% of the total power. And such switching consumption will cause negative influences to the switching components (or circuits), for instance, the increase of the working temperature, the excursion of working parameters of the switching components (or circuits), etc. In order to diminish this kind of switching consumption, many technologies relating to soft-switching are being developed. The working principle of these technologies is to make the current flowing through or the voltage across the switching components (or circuits) be zero or near zero during the turn-on and turn-off operation. In this way, the switching consumption shall be decreased accordingly. But heretofore, these types of soft-switching technology can only be used in DC power converts controlled by invariable frequency. And auxiliary circuits of such types of soft-switching are of great complexity with multiple components.

BRIEF INTRODUCTION OF THE INVENTION

The object of the present invention is to provide a method and apparatus for digital power processing operating with zero-voltage switching, which method and apparatus can overcome the defects in the prior art and enable to perform digital power conversion operating with zero-voltage switching under the circumstances of having variable frequencies and/or different load currents.

In the zero-voltage switching digital power converter according to the present invention, each of two switching components connected with the power supply is in parallel connection with a capacitance and in reverse parallel connection with a diode, respectively. These two switching components, together with their auxiliary circuits including the power supplies, the capacitances and the diodes, constitute the up side and down side of a semi-bridge circuit, and the semi-bridge circuit is connected to the output of the converter through an inductance.

In operation, the two switching components of the method and apparatus for digital power processing operating with zero-voltage switching can be turned off at the same time, and thus the converter is in a state with not output. It may also be such a case that one switching component is turned off while the other switching component is changed from turn-on to turn-off or vice versa. In the process of turn-on and turn-off, each of the two switching components is working in the situation that the voltages across the switching components are zero or near zero-voltage.

This invention also provides a digital power conversion apparatus applying the zero-voltage switching digital power converter described above, and a control circuit connected to the converter, the input of the control circuit is connected to an input signal, while two outputs of the control circuit are connected to the control terminals of the switching components within said converter, respectively, for providing said switching components with the control voltages for the turn-on or turn-off operations. The zero-voltage switching digital power converter cooperates with the control circuit so as to make the time intervals of the dead zones during which said two control voltages are both zero are longer than or equal to the time intervals during which the capacitances connected to respective switching components changing from turn-off to cut-on are discharged by the current flowing in the inductance so that the voltages across the respective capacitances reach zero, thereby the voltages across said corresponding switching components included in said zero-voltage switching digital power converter are zero or near zero when the switching components are turned on and turned off.

This invention also provides a method for performing zero-voltage digital power conversion by using the digital power conversion apparatus as described above. The method includes determining, from respective circuit parameters of the zero-voltage switching power converter, discharge times for respective switching components, during which discharge times, in the process that respective switching components change form turn-off to turn-on, respective capacitances connected with the respective switching components in parallel are discharged by the current flowing in the inductance so that the voltages across the respective capacitances reach zero. The control circuit is configured based on the determined discharge times, so as to make the dead zone time intervals between the two output control signals are longer than or equal to corresponding discharge time, thereby ensuring that the voltages across the respective switching components are zero or near zero while the two switching components are turned on and turned off under control of said control voltages.

The practical functions, features and operations of the present invention will be illuminated in detail with the help of attached figures. The embodiment below is just an exemplary implementing mode of the invention, and it does not mean the limitation to the present invention.

DETAILED DESCRIPTION OF THE PREFERRED EMBODIMENTS OF THE INVENTION

The present invention regarding apparatus and method for digital power conversion operating with zero voltage will be illustrated below in conjunction with FIGS. 1–3.

Figure 1:
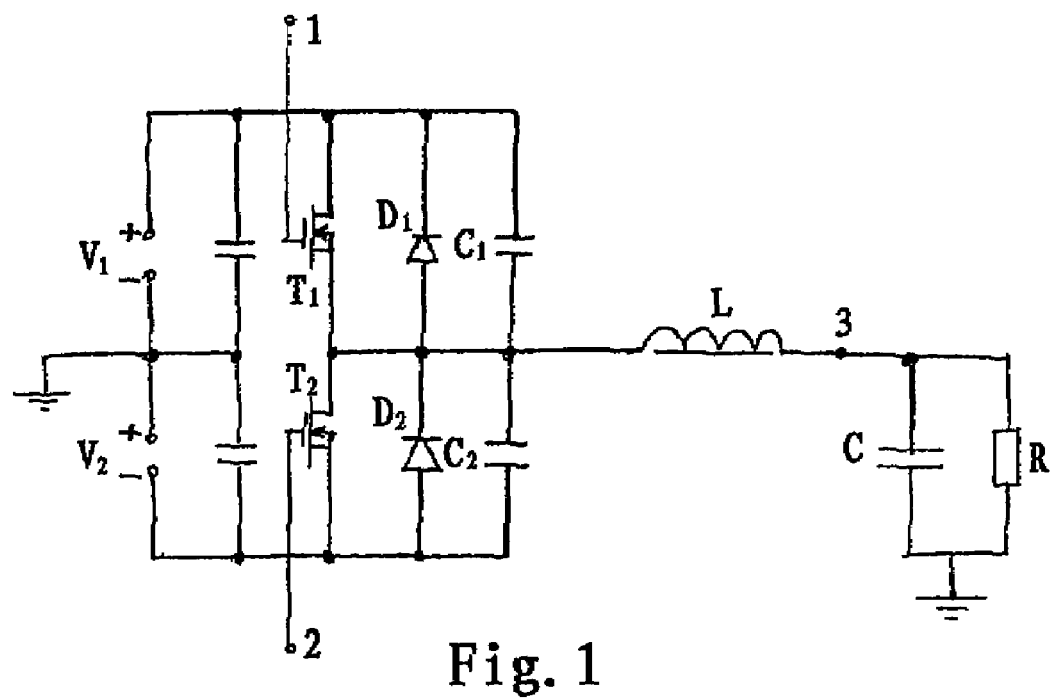
FIG. 1 is a circuit diagram showing the zero-voltage switching digital power converter according to an embodiment of the present invention.

In FIG. 1, two switching components $T_1$ and $T_2$ are connected to power supplies $V_1$ and $V_2$, respectively, are in parallel connection with capacitances $C_1$ and $C_2$ and in reverse parallel connection with diodes $D_1$ and $D_2$, respectively, and these two switching components, together with their auxiliary circuits, constitute the up side and down side of a semi-bridge circuit. The semi-bridge circuit connects to an inductance L connected to output terminal 3, and there is provided a capacitance C between node 3 and ground. The power can be applied to electric appliance R through terminal 3.

Figure 2:
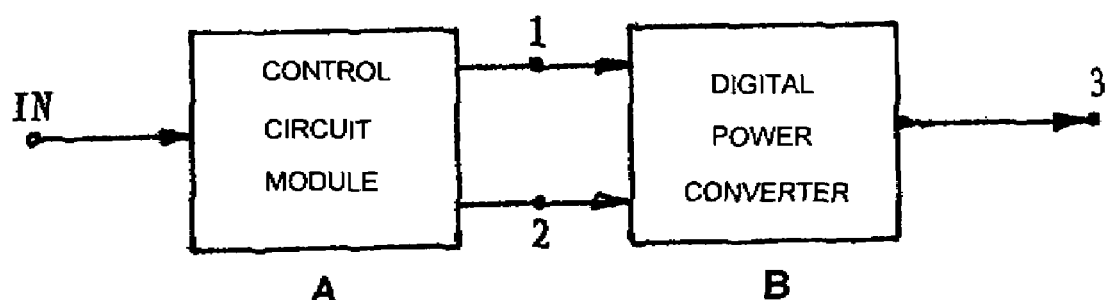
FIG. 2 is a block diagram showing the zero-voltage switching digital power conversion apparatus according to the present invention.

FIG. 2 is a block diagram of the digital power conversion apparatus according to the present invention. As shown in FIG. 2, the apparatus includes two modules, i.e. zero-voltage switching digital power converter B as described above and control circuit module A, which two modules are connected in series. As far as their function is concerned, module B serves as the zero-voltage switching digital power converter, and input 1 of module A receives the input signal which needs to be subjected to power conversion. And the two outputs of module A connect to control voltage terminals 1 and 2 of the switching components $T_1$ and $T_2$ in module B, respectively, so as to provide with the two switching components $T_1$ and $T_2$ the control voltages $U_{T1}$ and $U_{T2}$ for controlling the turn-on and turn-off operation of $T_1$ and $T_2$.

As can be seen from FIG. 2, the two control signals that generated by the control circuit are outputted to switching components $T_1$ and $T_2$ through terminals 1 and 2 for controlling the turn-on and turn-off status of switching components $T_1$ and $T_2$.

A whole working cycle of the method and apparatus for digital power conversion operating with zero-voltage switching according to the present invention will be described in conjunction with FIG. 1 and FIG. 2

When switching component $T_2$ is turned off, the control signal inputted through terminal through terminal 1 keeps switching component $T_1$ on. At this time, the power supply $V_1$ connects to terminal 3 through switching component $T_1$ and inductance L to supply voltage $V_1$ to working electric appliance R via terminal 3. Since switching component $T_1$ is turned on and switching component $T_2$ is turned off, the voltage across capacitance $C_1$ connected to switching component $T_1$ in parallel is zero, while the voltage across capacitance $C_2$ connected to switching component $T_2$ in parallel is $V_1+V_2$ ($V_1$ equals to $V_2$). When the control signal inputted from terminal 1 becomes zero, switching component $T_1$ is turned off. At this moment, since the voltage across capacitance $C_1$ is zero, i.e. the voltage across the switching component $T_1$ connected to capacitance $C_1$ in parallel is zero, the switching consumption of switching component $T_1$ is zero when it turns off. At the same time, since the current flowing in inductance L must be kept continuous, capacitance $C_2$ is discharged by the inductance current and capacitance $C_1$ is charged by the inductance current until the voltage across capacitance $C_2$ becomes negative. In such a case, diode $D_2$ conducts to suppress the voltage across $C_2$ to a negative voltage near zero. At this time, the voltage across $C_1$ is approximately $V_1+V_2$.

Starting from the time point when the control signal inputted through terminal 1 becomes zero, after a lapse of delay T during which capacitance $C_2$ is discharged, $C_1$ is charged and the voltage across capacitance $C_2$ closes to zero, the control signal inputted from terminal 2 makes switching component $T_2$ turn on. At this moment, since the voltage across capacitance $C_2$ is near zero, the voltage across switching component $T_2$ is also near zero when it is turned on. Accordingly, the switching consumption of switching component $T_2$ is zero when it is turned on.

Figure 3:
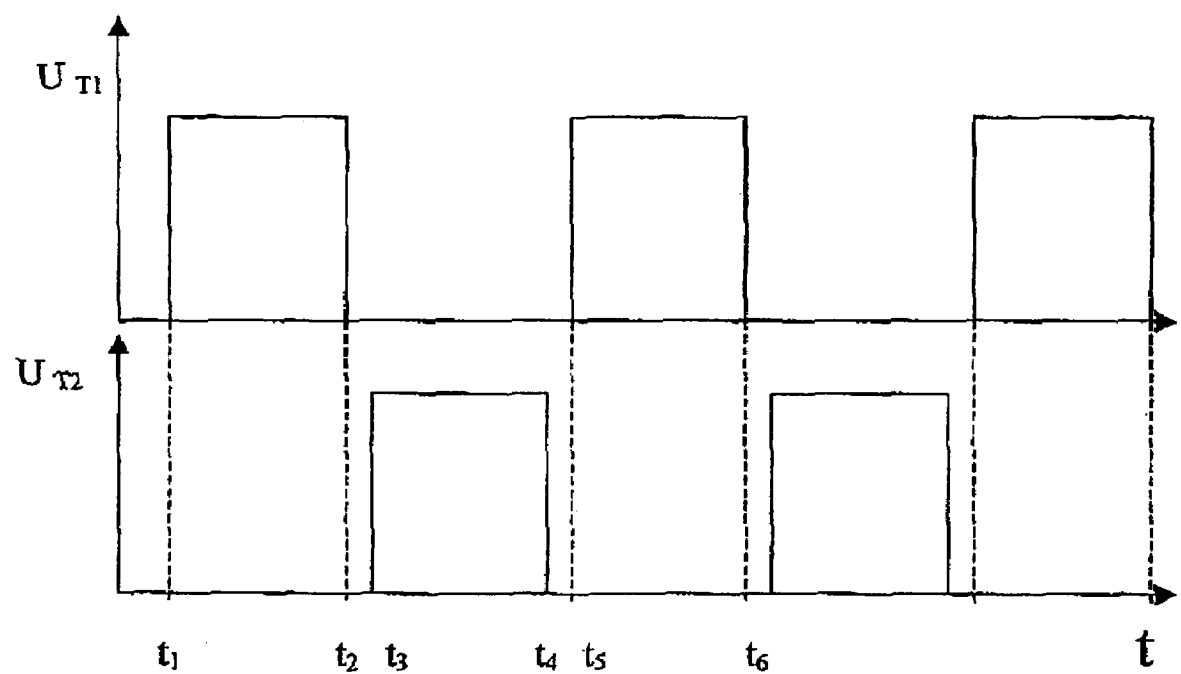
FIG. 3 is a time sequence diagram showing two control signals of the method and apparatus for digital power processing operating with zero-voltage switching according to the present invention.

The procedure of the above working cycle will be described in detail in conjunction with the time sequence of the control signals as shown in FIG. 3. FIG. 3 shows time sequence relationship of said two control signals as described in FIG. 2. In FIG. 3, $U_{T1}$ represents grid control voltage for $T_1$ and $U_{T1}$ represents grid control voltage for $T_2$. In FIG. 3:

Stage 1 (t1–t2): T1 is turned on, and T2 is turned off.
Stage 2 (t2–t3): T1 is turned off, and T2 is turned off.
Stage 3 (t3–t4): T1 is turned off, and T2 is turned on.
Stage 4 (t4–t5): T1 is turned off, and T2 is turned off.
Stage 5 (t5–t6): Stage 1 is repeated.

The working procedure is as follow:

Assuming that the working procedure begins with stage 1, and at this moment, $T_1$ is turned on and $T_2$ is turned off, $U_{C1}=0$, $U_{C2}=V_1+V_2$, and the current coming from power source $V_1$ flows through $T_1$, L and R to form a loop. At t2, stage 1 ends and stage 2 begins.

When stage 2 begins, $T_1$ is turned off, and since at t2, $U_{C1}=0$, $T_1$ is turned off with zero-voltage switching. At this time, inductance current will not change abruptly and thus is still flows to terminal 3. Since $T_1$ is turned off, the inductance current must be kept continuous by the charge of $C_1$ and the discharge of $C_2$. Because normally $C_1$ and $C_2$ are output capacitances of $T_1$ and $T_2$ with small quantity, while the inductance current flowing in L is quite large, it takes very short time to charge C1 up a voltage of $U_{C1}=V_1+V_2$ and discharge $C_2$ to a voltage of $U_{C2}=0$. The inductance current is still flowing to terminal 3. At this time, the voltages of the capacitances will not change any more, because $U_{C1}$ and $U_{C2}$ are suppressed by $D_2$. Current flows from the negative terminal ("–") of the power source $V_2$ to L and R via $D_2$ until at t3, stage 2 ends and stage 3 begins.

While stage 3 begins, $T_2$ is turned on. Since at t3, $U_{C2}=0$, $T_2$ is turned off with zero-voltage switching, while $T_1$ is turning off. Current flows from the negative terminal ("–") of $V_2$ to L and R via $D_2$, and this is actually a condition that $V_2$ is charged by stored energy of the inductance current. The stored energy of the inductance runs out soon and the inductance current becomes zero. Now, the current flows from the positive terminal ("+") of $V_2$ to R and L via the ground and to the negative terminal ("–") of $V_2$ via $T_2$. At this time, the direction of the current is changed to from terminal 3 to L and $T_2$. At t4, stage 3 ends and stage 4 begins.

When stage 4 begins, $T_2$ is turned off. Since at t4, $U_{C2}=0$, T2 is turned off with zero-voltage switching. The current can not flow to the power supply through T2, but can only charge though $C_2$ and discharge $C_2$, making $C_2$ be charged quickly and $C_1$ be discharged so that the voltages across $C_2$ and $C_1$ become $U_{C2}=V_1+V_2$ and $U_{C1}=0$, respectively. At this time, $UC_1$ and $U_{C2}$ are suppressed by D1, and the current flows to the positive terminal ("+") of $V_1$ through $D_1$. At t5, stage 4 ends and stage 5 begins.

When stage 5 begins, $T_1$ is turned on. Because at this time $U_{C1}=0$, $T_1$ is turned on with zero-voltage switching. Form then on stage 1 is repeated.

As described above, it is a cycle from stage 1 to stage 4, in which $T_1$ and $T_2$ perform the conversion between the turn-on and turn-off status under the condition that the voltages across $T_1$ and $T_2$ are zero or near zero. In this way, the object of reducing the switching consumption can be achieved.

In the above embodiment, the time interval of stage 2, namely the dead zone time interval is longer than or equal to the time interval during which $C_1$ is charged and $C_2$ is discharged by the inductance current till $U_{C2}$=0; furthermore, the time interval of stage 4, namely the other dead zone time interval is longer than or equal to the time interval during which $C_1$ is discharged and $C_2$ is charged by the inductance current until $U_{C1}$=0.

It can be known from the above descriptions, that the key to achieve zero-voltage switching lies in the cooperation of the circuit topology structure as shown in FIG. 1, dead zone time intervals t3–t2, t5–t4, and the parameters of C, $C_1$, $C_2$, L and R.

Therefore, according to the present invention, the steps of the method for digital power conversion operating with zero-voltage switching are as follows: providing said digital power conversion apparatus; determining the discharge times based on respective parameters of $C_1$, $C_2$, L, C, R of the zero-voltage switching digital power converter, during which discharge times, when the turn-off status of T1 and T2 are changed to turn-on status, $C_1$ and $C_2$ connected to switching components T1 and T2 in parallel, respectively, are discharged by the inductance current of inductance L so that the voltages across $C_1$ and $C_2$ reach zero; in accordance with the above determined discharge times, configuring the control circuit to make it control the dead zone time intervals between the outputted control voltage signals $U_{T1}$ and $U_{T2}$ so that the dead zone time intervals are longer than or equal to corresponding discharge times, so as to guarantee that the voltage across $T_1$ and $T_2$ is kept at zero or near zero when T1 and T2 are turned on and turned off under control of said control voltages. As described above, in this embodiment, the time interval of stage 2, namely the dead zone time interval is longer than or equal to the time interval during which $C_1$ is charged and $C_2$ is discharged by the inductance current till $U_{C2}$=0; furthermore, the time interval of stage 4, namely the other dead zone time interval is longer than or equal to the time interval during which $C_1$ is discharged and $C_2$ is charged by the inductance current until $U_{C1}$=0.

In the above embodiment, $C_1$ and $C_2$ are the output capacitances of MOSFET $T_1$ and $T_2$, respectively, where in $C_2=C_1$.

In the above embodiment, switching components T1 and T2 are MOSFETs.

In the embodiment, since the control signal can be arbitrary signal, the zero-voltage switching can be completed under various frequencies and the switching consumption can be reduced to less than 5%. Meanwhile, since the consumption is reduced, the switching frequency can be greatly raised and thus the working frequency is broadened.

Although the present invention has been described with reference to specific exemplary embodiments, is will be evident to one of ordinary skill in the art that various modifications and changes may be made to these embodiments without departing from the broader spirit and scope of the invention as set forth in the claims.

What is claimed is:

1. An zero-voltage switching digital power converter characterized in that the converter comprises two switching components, each of the two switching components is connected to a power supply and is in parallel connection with a capacitance and in reverse parallel connection with a diode, respectively, said switching components, together with their auxiliary circuits, constitute respectively the up side and down side of a semi-bridge circuit which is connected to an output terminal of the converter via an inductance wherein the time intervals during which the status in which the two switching components are all turned off is changed to the status in which one of the two switching is turned on and the other is turned off is larger than or equal to the time intervals during which the capacitance connected in parallel to the switching component changing from turn-on to turn-off is charged by the current of the inductance and the capacitance connected in parallel to the switching component changing from turn-off to turn-on is discharged by the current of the inductance till the voltage across the capacitance reaches zero.

2. The zero-voltage switching digital power converter according to the claim 1, characterized in that the switching components can be any types of switching devices.

3. The zero-voltage switching digital power converter according to claim 1, characterized in that said two capacitances are equal to each other and are output capacitances of said switching components, respectively.

4. A digital power conversion apparatus applying the zero-voltage switching digital power converter according to any one of claims 1–3, comprising: a control circuit connected to the converter, the input of the control circuit is connected to an input signal, while two outputs of the control circuit are connected to the control terminals of the switching components within said converter, respectively, for providing said switching components with the control voltages for their turn-on or turn-off operations; and said zero-voltage switching digital power converter cooperates with the control circuit so as to make the time intervals of the dead zones during which said two control voltages are both zero are longer than or equal to the time intervals during which the capacitances connected in parallel to respective switching components changing form turn-off to turn-on are discharged by the current of the inductance so that the voltages across the respective capacitances reach zero, thereby the voltages across said respective switching components included in said zero-voltage switching digital power converter are zero or near zero when the switching components are turned on and turned off.

5. A method for performing zero-voltage digital power conversion by using the digital power conversion apparatus according to claim 4, comprising the following steps: determining, from respective circuit parameters of the zero-voltage switching power converter, discharge times, during which discharge times, in the process that respective switching components change form turn-off to turn-on, respective capacitances connected with the respective switching components in parallel are discharged by the current of the inductance so that the voltage across the respective capacitances reach zero; configuring the control circuit based on the determined discharge times, so as to make the dead zone time intervals between the two output control signals are longer than or equal to corresponding discharge times, thereby ensuring that the voltages across the switching components are zero or near zero while the two switching components are turned on and turned off under control of said control voltages.

* * * * *